US007831270B2

(12) United States Patent
Kalley et al.

(10) Patent No.: US 7,831,270 B2
(45) Date of Patent: Nov. 9, 2010

(54) PROVIDING VIRTUAL TALK GROUP COMMUNICATION SESSIONS IN ACCORDANCE WITH ENDPOINT RESOURCES

(75) Inventors: Yogesh Kalley, Sunnyvale, CA (US);
Kittur V. Nagesh, Saratoga, CA (US);
Shmuel Shaffer, Palo Alto, CA (US);
Dean M. Zanone, Norco, CA (US)

(73) Assignee: Cisco Technology, Inc., San Jose, CA (US)

( * ) Notice: Subject to any disclaimer, the term of this patent is extended or adjusted under 35 U.S.C. 154(b) by 739 days.

(21) Appl. No.: 11/383,998

(22) Filed: May 18, 2006

(65) Prior Publication Data
US 2007/0270172 A1 Nov. 22, 2007

(51) Int. Cl.
| | |
|---|---|
| H04B 7/00 | (2006.01) |
| H04W 24/00 | (2009.01) |
| H04W 4/00 | (2009.01) |
| G01R 31/08 | (2006.01) |
| G06F 11/00 | (2006.01) |
| G06F 15/16 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/16 | (2006.01) |
| H04Q 11/00 | (2006.01) |
| H04M 11/04 | (2006.01) |
| H04M 3/42 | (2006.01) |

(52) U.S. Cl. .................. 455/518; 455/519; 455/520; 455/456.2; 370/230; 370/260; 370/338; 379/37; 379/201.02; 709/204; 709/206

(58) Field of Classification Search .............. 455/445, 455/509, 512, 515, 517, 518, 519, 520, 552.1, 455/552.2, 17, 412.1, 446, 456.2, 426.1, 455/450, 452, 466, 560, 561; 370/229, 255, 370/260, 270, 312, 328, 370, 338, 340, 390, 370/432, 465, 335, 349, 353, 392, 447, 321, 370/337, 341, 352, 345, 355, 356, 347, 442, 370/468, 230, 236.2, 254, 236.1; 379/201.12, 379/215.01, 372, 201.02, 37; 709/201, 204–206, 709/227, 221, 218, 226, 229
See application file for complete search history.

(56) References Cited

U.S. PATENT DOCUMENTS 4,359,603 A 11/1982 Heaton .................. 370/267

(Continued)

FOREIGN PATENT DOCUMENTS

| WO | WO 01/91485 | 11/2001 |
|---|---|---|
| WO | WO 02/074051 | 9/2002 |

OTHER PUBLICATIONS

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

(Continued)

*Primary Examiner*—Andrew Wendell
*Assistant Examiner*—Paul P Tran
(74) *Attorney, Agent, or Firm*—Baker Botts L.L.P.

(57) ABSTRACT

Providing one or more virtual talk groups to an endpoint includes establishing one or more resources of a user endpoint. Demand of the one or more virtual talk groups is estimated, where the demand is placed on the one or more resources. Whether the one or more resources are capable of satisfying the demand is determined. At least a subset of the one or more virtual talk groups that may be presented to the user endpoint is established, if the one or more resources are not capable of satisfying the demand. At least the subset of the one or more virtual talk groups is provided to the user endpoint.

29 Claims, 3 Drawing Sheets

U.S. PATENT DOCUMENTS

| | | | |
|---|---|---|---|
| 4,730,306 A | 3/1988 | Uchida | 370/263 |
| 5,048,082 A | 9/1991 | Krafft et al. | 379/406.07 |
| 5,099,510 A | 3/1992 | Blinken et al. | 379/202.01 |
| 5,387,905 A * | 2/1995 | Grube et al. | 340/825.52 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | O'Connor et al. | 381/17 |
| 6,094,578 A | 7/2000 | Purcell et al. | 455/426 |
| 6,141,347 A * | 10/2000 | Shaughnessy et al. | 370/390 |
| 6,178,237 B1 | 1/2001 | Horn | 379/202.01 |
| 6,185,205 B1 | 2/2001 | Sharrit et al. | 370/389 |
| 6,233,315 B1 | 5/2001 | Reformato et al. | 379/88.01 |
| 6,327,567 B1 | 12/2001 | Willehadson et al. | 704/270 |
| 6,374,100 B1 | 4/2002 | Smith et al. | 455/419 |
| 6,400,816 B1 | 6/2002 | Hjalmtysson et al. | 379/201.03 |
| 6,404,873 B1 | 6/2002 | Beyda et al. | 379/202.01 |
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw, Jr. | 370/260 |
| 6,647,020 B1 * | 11/2003 | Maher et al. | 370/432 |
| 6,792,092 B1 | 9/2004 | Michalewicz | 379/202 |
| 6,850,496 B1 | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 * | 4/2005 | Grube et al. | 455/520 |
| 6,912,389 B2 | 6/2005 | Bright et al. | 455/433 |
| 6,950,874 B2 * | 9/2005 | Chang et al. | 709/229 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/419 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 7,366,780 B2 * | 4/2008 | Keller et al. | 709/227 |
| 7,369,567 B2 * | 5/2008 | Newberg et al. | 370/432 |
| 2001/0028321 A1 | 10/2001 | Krasner | 342/357.1 |
| 2002/0013813 A1 | 1/2002 | Matsuoka | 709/204 |
| 2002/0067710 A1 * | 6/2002 | Helm et al. | 370/338 |
| 2002/0152305 A1 | 10/2002 | Jackson et al. | 709/224 |
| 2002/0178364 A1 | 11/2002 | Weiss | 713/182 |
| 2003/0100326 A1 | 5/2003 | Grube et al. | 455/515 |
| 2004/0054428 A1 | 3/2004 | Sheha et al. | 700/56 |
| 2004/0070515 A1 | 4/2004 | Burkley et al. | 340/825.49 |
| 2004/0139320 A1 | 7/2004 | Shinohara | 713/168 |
| 2004/0185863 A1 | 9/2004 | Ogami | 455/452.1 |
| 2004/0192353 A1 | 9/2004 | Mason et al. | 455/457 |
| 2004/0249949 A1 | 12/2004 | Gourraud et al. | 709/227 |
| 2005/0068904 A1 * | 3/2005 | Wildfeuer et al. | 370/259 |
| 2005/0135348 A1 | 6/2005 | Staack | 370/353 |
| 2005/0174991 A1 | 8/2005 | Keagy | 370/352 |
| 2005/0232207 A1 | 10/2005 | Antoniadis et al. | 370/338 |
| 2005/0265256 A1 | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0140138 A1 * | 6/2006 | Hill | 370/270 |
| 2006/0165060 A1 | 7/2006 | Dua | 370/352 |
| 2007/0030144 A1 | 2/2007 | Titus et al. | 340/534 |
| 2007/0060144 A1 | 3/2007 | Mills et al. | 455/445 |
| 2007/0115848 A1 | 5/2007 | Chean et al. | 370/252 |
| 2008/0037461 A1 | 2/2008 | Biltz et al. | 370/328 |
| 2008/0167049 A1 | 7/2008 | Karr et al. | 455/456 |

OTHER PUBLICATIONS

OnStar Technology, Information Sheet, OnStar Corp., http://www.onstar.com/us_english/jsp/explore/onstar_basics/technology.jsp, 3 pages, 2005.

Matthews, et al., *A New Interoperability Paradigm A Concept Proposal*, Mar. 2006, Worcester Polytechnic Institute, WPI Bioengineering Institute 15 pages.

Shaffer, et al., U.S. Appl. No. 11/149,041, filed Jun. 8, 2005, *Method and System for Communicating Using Position Information*.

Shaffer, et al., U.S. Appl. No. 11/201,832, filed Aug. 10, 2005, *Method and System for Automatic Configuration of Virtual Talk Groups Based on Location of Media Source*.

Shaffer, et al., U.S. Appl. No. 11/202,400, filed Aug. 10, 2005, *Method and System for Communicating Media Based on Location of Media Source*.

Shaffer, et al., U.S. Appl. No. 11/202,403, filed Aug. 10, 2005, *Method and System for Providing Interoperable Communications with Location Information*.

Shaffer, et al., U.S. Appl. No. 11/214,582, filed Aug. 29, 2005, *Method and System for Conveying Source Location Information*.

Shaffer, et al., U.S. Appl. No. 11/364,146, filed Feb. 27, 2006, *Method and System for Providing Interoperable Communication with Congestion Management*.

Shaffer, et al., U.S. Appl. No. 11/365,113, filed Feb. 28, 2006, *Method and System for Providing Interoperable Communication with Dynamic Event Area Allocation*.

Shaffer, et al., U.S. Appl. No. 11/399,031, filed Apr. 5, 2006, *Method and System for Managing Virtual Talk Groups*.

Shaffer, et al., U.S. Appl. No. 11/382,496, filed May 10, 2006, *Providing Multiple Virtual Talk Group Communication Sessions*, Mar. 10, 2006.

Shaffer, et al., U.S. Appl. No. 11/421,994, filed Jun. 2, 2006, *Method and System for Joining a Virtual Talk Group*.

Shaffer, et al., U.S. Appl. No. 11/421,999, filed Jun. 2, 2006, *Method and System for Managing a Plurality of Virtual Talk Groups*.

Shaffer, et al., U.S. Appl. No. 11/617,019, filed Dec. 28, 2006, *Method and System for Providing Congestion Management within a Virtual Talk Group*.

Shaffer, et al., U.S. Appl. No. 11/746,960, filed May 10, 2007, *Method and System for Handling Dynamic Incidents*.

Shaffer, et al., U.S. Appl. No. 11/550,234, filed Oct. 17, 2006, *Method and System for Providing an Indication of a Communication*.

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

PCT Notification of Transmittal of the International Search Report and the Written Opinion of the International Searching Authority, or the Declaration, mailed Apr. 9, 2007, corresponding to PCT/US06/30294 filed Aug. 2, 2006, (20 pages).

Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

Network Solution:, Information Sheet, NetworkFirst, M/A-COM, Inc., http://www.networkfirst.com/features/solution, 2 pages, 2003.

ACU-1000™ Interoperability NOW™, Information Sheet, Raytheon JPS Communications, http://www.jps.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.pdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power, Aug. 18, 2002.

Jim McKay, *Government Technology*, "Intact Amid Chaos", Mar. 2005, 2 pages, Mar. 2005.

Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 For '05 Technologies," Dec. 1, 2004, 9 pages. http://mrtmag.com/mag/radio_technologies.

MRT Urgent Communications: Service, Safety, Security, John Facella, "ROIP Success Is in the Details," Dec. 1, 2004, 3 pages. http://mrtmag.com/mag/radio_roip_success_details/.

Ann Imse, *Rocky Mountain News*, "Radio Breakthrough for Cops, Firefighters," Dec. 10, 2004, 2 pgs.

*First Responder Communications*, A Supplement to MRT and Fire Chief, "IP Opens Eyes," Aug. 2004, 5 pages.

*MRT, Mobile Radio Technology*, "IP Evangelist," Apr. 2004, 4 pages, www.iwce-mrt.com.

Ron Bender, et al., *MRT; Mobile Radio Technology* "Multiple Choices for Critical Communications," Oct. 2001, 4 pages, www.mrtmag.com.

Jay Herther, et al., *MRT; Mobile Radio Technology*, "Voice-over-Interintranet Protocol for Critical Communications," Aug. 2001, 4 pages, www.mrtmag.com.

What's New in Radio Communications, Aug./Sep. 2001, vol. 14 No. 1, Inside: Marine Radio, 2 pages, www.westwick-farrow.com.au.

PCT International Search Report and Written Opinion (ISA/US) for PCT/US06/19227; 7 pages, Sep. 4, 2007.

Patent Pending U.S. Appl. No. 11/267,645 entitled, "*Method and System for Providing a Push-To-Talk Communication Session*", 63 pages specification, claims and abstract, 4 pages of drawings, inventors Shmuel (nmi) Shaffer, et al, filed Nov. 4, 2005.

Patent Pending U.S. Appl. No. 11/267,693 entitled, "*Method and System for Providing a Push-To-Talk Communication Session Using a Control Endpoint*", 65 pages specification, claims and abstract, 4 pages of drawings, inventors Shmuel (nmi) Shaffer, et al, filed Nov. 4, 2005.

* cited by examiner

PROVIDING VIRTUAL TALK GROUP COMMUNICATION SESSIONS IN ACCORDANCE WITH ENDPOINT RESOURCES

TECHNICAL FIELD OF THE INVENTION

This invention relates in general to communication systems and, more particularly, to a method and system for providing virtual talk group communication sessions in accordance with endpoint resources.

BACKGROUND OF THE INVENTION

Public and private groups such as groups of security and safety personnel (for example, police officers, fire fighters, and emergency medical technicians) may need to communicate with each other. These groups, however, may utilize endpoints and communication networks that use different technologies. For example, safety personnel may utilize land mobile radios communicating using push-to-talk technologies, while police dispatchers may utilize personal computers communicating using wired network technologies.

Interoperability solutions attempt to provide communications among different endpoints and different networks. Organizations working towards interoperability solutions include JPS COMMUNICATIONS of RAYTHEON CORPORATION, IP BLUE SOFTWARE SOLUTIONS, TWISTED PAIR SOLUTIONS, INC., M/A-COM, INC., MOTOROLA, INC., and CISCO SYSTEMS, INC.

Communications among different endpoints and different networks, however, may be difficult. Collaboration between the different groups and networks tends to be ad hoc and inefficient, and often involves laborious manual intervention.

SUMMARY OF THE INVENTION

The present invention provides a method and system for providing virtual talk group communication sessions that substantially reduce or eliminate at least some of the disadvantages and problems associated with previous methods and systems.

In accordance with a particular embodiment, providing one or more virtual talk groups to an endpoint includes establishing one or more resources of a user endpoint. Demand of the one or more virtual talk groups is estimated, where the demand is placed on the one or more resources. Whether the one or more resources are capable of satisfying the demand is determined. At least a subset of the one or more virtual talk groups that may be presented to the user endpoint is established, if the one or more resources are not capable of satisfying the demand. At least the subset of the one or more virtual talk groups is provided to the user endpoint.

In accordance with another embodiment, at least the subset of the one or more virtual talk groups may be established by presenting the one or more virtual talk groups for selection, and by receiving a selection of at least the subset of the one or more virtual talk groups.

In accordance with another embodiment, at least the subset of the one or more virtual talk groups may be established by presenting one or more features of the one or more virtual talk groups for selection, and by receiving a selection of at least a subset of the one or more features.

In accordance with another embodiment, one or more options may be presented to a dispatcher endpoint or to the user endpoint for selection. Selection of an option of the one or more options may be operable to reduce the demand or increase the one or more resources.

Technical advantages of particular embodiments include managing the capabilities of an endpoint by determining whether an endpoint has sufficient resources to participate in virtual talk groups that may be accessed by the endpoint, and establishing at least a subset of the virtual talk groups that may be presented to the endpoint if it does not have sufficient resources.

In addition, in particular embodiments, the subset of virtual talk groups may be established by presenting options that may be selected to either increase the resources or reduce the demand. The virtual talk groups may be selected in accordance with the selections.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
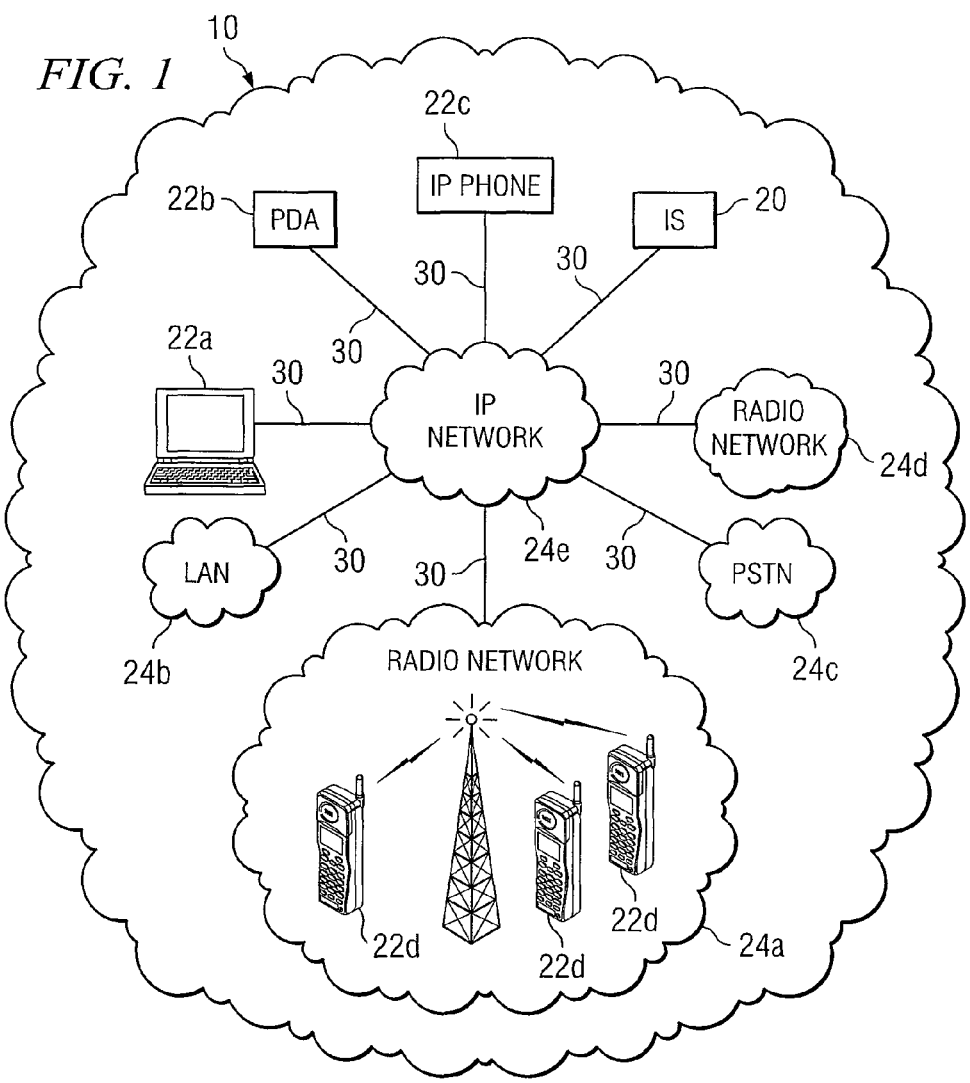
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24*a*-24*e*, an interoperability system (IS) 20, and endpoints 22*a*-22*d*. IS 20 is able to facilitate interoperable communication sessions between and among various communication devices, such as endpoints 22. IS 20 may use a systems approach to offer a framework based on Internet Protocol (IP) protocols and services in order to provide secure voice, video, and other data interoperability among endpoints 22 and networks 24 utilizing different technologies.

According to the embodiment, endpoints 22 may include one or more push-to-talk (PTT) endpoints that may participate in one or more communication sessions. Communication system 10 may manage the capabilities of endpoints 22 by determining whether an endpoint 22 has sufficient resources to participate in virtual talk groups that may be accessed by the endpoint 22, and establishes at least a subset of the virtual talk groups that may be presented to the endpoint 22 if it does not have sufficient resources. The subset of virtual talk groups may be established by presenting options that may be selected to either increase the resources or reduce the demand. The virtual talk groups may be selected in accordance with the selections.

According to the illustrated embodiment, communication system 10 operates to allow endpoints 22 to participate in one or more communication sessions. A communication session may refer to an active communication among two or more endpoints 22. As an example, a communication session may occur between an endpoint 22 and another endpoint 22, or between an endpoint 22 and a defined set of other endpoints 22. Information is communicated during a communication session. Information may refer to voice, data, text, audio, video, multimedia, control, signaling, other information, or any combination of the preceding.

Communication system 10 includes communication networks 24a-24e. Communication networks 24 may be distributed locally or across multiple cities or other geographic regions. A communication network 24 may comprise any suitable IP or non-IP communication network of any wireless or wireline form.

A communication network 24 may comprise at least a portion of one or more of the following: a public switched telephone network (PSTN), a public or private data network, a local area network (LAN), a metropolitan area network (MAN), a wide area network (WAN), a local, a cellular network, regional, or global communication or computer network such as the Internet, a wireline or wireless network, an enterprise intranet, a land mobile radios (LMR) network, a Code Division Multiple Access (CDMA) network, a Time Division Multiple Access (TDMA) network, a Global System for Mobile Communications (GSM) network, a satellite network, other suitable network, or any combination of the preceding.

A communication network 24 may utilize communication protocols and technologies to provide the communication sessions. Example communication protocols and technologies include those set by the Institute of Electrical and Electronics Engineers, Inc. (IEEE) 802.xx, the International Telecommunications Union (ITU-T) standards, the European Telecommunications Standards Institute (ETSI) standards, the Internet Engineering Task Force (IETF) standards, or other standards.

As an example, a communication network 24 may communicate data in streams of packets according to a packet technology for example, Internet Protocol (IP) technology. A packet technology may allow for the addressing or identification of endpoints, nodes, and/or other devices of or coupled to the communication network 24. For example, each device coupled to an IP network may be identified using IP addresses. In this manner, the communication network 24 may support any form and/or combination of point-to-point, multicast, unicast, or other techniques for exchanging media packets among components of communication system 10.

As another example, a communication network 24 may receive and transmit data in a Session Initiation Protocol (SIP) environment. SIP is an application-layer control protocol that includes primitives for establishing, modifying, and terminating communication sessions. SIP works independently of underlying transport protocols and of the type of session that is being established. SIP also transparently supports name mapping and redirection services, which support personal mobility.

Communication system 10 may comprise any suitable number of any suitable communication networks 24. In the illustrated embodiment, communication networks 24a and 24d comprise radio networks (RNs), communication network 24b comprises a LAN, communication network 24c comprises a PSTN, and communication network 24e comprises an IP network.

Radio networks 24a and 24d may support communication among mobile endpoints, such as land mobile radios (LMRs), using any suitable communication methods or features, such as cellular or push-to-talk (PTT). PSTN 24c may include switching stations, central offices, mobile telephone switching offices, pager switching offices, remote terminals, other related telecommunications equipment, or any combination of any of the preceding.

Communication network 24b may communicate signals transmitted to telephony devices located on different, but interconnected, IP networks. Communication network 24b may also be coupled to non-IP telecommunication networks through, for example, the use of interfaces or components, including gateways. In one embodiment, communication network 24b may be coupled with PSTN 24c through a gateway, which may be a part of IS 20 or network 24e.

Communication networks 24 may comprise networks of particular public and private groups such as agencies or companies. For example, communication networks 24 may comprise networks for security and safety personnel (for example, police officers, fire fighters, or emergency medical technicians) or for a particular company. Communication networks 24 may be operational with respect to a particular area or otherwise.

Communication networks 24 may include any number and combination of devices. In general, a device may include any suitable arrangement of components operable to perform the operations of the device, and may comprise logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations. For example, a processor may comprise a microprocessor, controller, or any other suitable computing device.

"Interface" may refer to logic of a device operable to receive input for the device, send output from the device, perform suitable processing of the input or output or both, or any combination of the preceding, and may comprise one or more ports, conversion software, or both. "Memory" may refer to volatile or non-volatile logic operable to store and facilitate retrieval of information, and may comprise Random Access Memory (RAM), Read Only Memory (ROM), optical media, magnetic media, a disk drive, a Compact Disk (CD) drive, a Digital Video Disk (DVD) drive, removable media, any other suitable local or remote data storage medium, or a combination of any of the preceding.

Communication networks 24 may include any suitable number of any suitable combination of segments, nodes, and endpoints to enable communication. A node may comprise any suitable number of any suitable communication devices. One or more nodes of a communication network 24 may include network components, gatekeepers, call managers, conference bridges, routers, hubs, switches, gateways, base stations, endpoints, other devices that allow for the exchange of data in communication system 10, or any combination of any of the preceding.

Segments 30 couple networks 24, endpoints 22, and IS 20. Segments 30 may comprise any suitable wireless or wireline communication links, including one or more communication networks. In particular embodiments, segments 30 may include gateways for facilitating communication between various networks, such as an LMR gateway between radio network 24a and IP network 24e.

Endpoints 22 may represent any suitable device or system of devices operable to provide communication services to a user. Endpoints 22 may provide communication services by sending and receiving streams of packets.

An example endpoint 22 may comprise a telephone, a cellular phone, an IP phone, a personal digital assistant (PDA), a fax machine, a personal computer (PC), a sensor such as a camera or a video monitor, a land mobile radio (LMR), a command center, a gateway, any other communication device or system of devices, or any suitable combination of any of the preceding. In the illustrated embodiment, endpoints 22 comprise a PC (endpoint 22a), a PDA (endpoint 22b), an IP phone (endpoint 22c), and LMRs (endpoints 22d). Endpoints 22 and IS 20 may also include unattended or automated systems, gateways, or other devices that can establish media sessions.

Endpoints 22 may be IP or non-IP enabled. IP enabled endpoints 22 may comprise IP telephony devices capable of participating in IM, video, and other multimedia communication sessions. IP telephony devices have the ability to encapsulate user input (such as voice) into IP packets so that the input can be transmitted over a communication network. IP telephony devices may use Voice over IP (VoIP), or Voice over Packet (VoP), technology. Endpoints 22 may include endpoint devices running telephony software, other device capable of performing telephony functions, or any suitable combination of any of the preceding.

IS 20 enables, facilitates, and/or provides for interoperable communication among communication devices, such as endpoints 22, using IP. As indicated above, such network interoperability includes the interoperability of push-to-talk voice technology within various networks and the interoperability between push-to-talk and full duplex dialed connections.

IS 20 may map devices to IP addresses to allow the devices to communicate with other devices. As an example, IS 20 may control gateways of segments 30 to map radio frequencies of particular radio endpoints to IP addresses to allow the radio endpoints to communicate with each other. In some embodiments, IS 20 may host conferences that bridge communications received from endpoints.

Addresses may be assigned in any suitable manner. Multicast IP addresses may be assigned one or more endpoints of one or more communication networks. As an example, a group of endpoints may be combined into a virtual talk group (VTG) for communication using a particular IP address. The virtual talk group may be assigned a multicast IP address through which endpoints of the talk group may communicate.

IS 20 may communicate in other manners. As an example, IS 20 may communicate using a peer-to-peer dialed connection or a nailed dialed connection. Communication methods may be combined to facilitate communication among endpoints. For example, in some cases certain endpoints of a virtual talk group may participate in the talk group through a multicast IP address, while other endpoints may utilize a nailed SIP connection.

IS 20 may be utilized and implemented in any number of market segments, such as enterprise safety and security (for example, loss prevention), transportation, retail, public safety, and federal agencies in order to provide radio and non-radio network interoperability within and between such market segments.

According to the embodiment, communication system 10 may manage the capabilities of endpoints 22 by determining whether an endpoint 22 has sufficient resources to participate in virtual talk groups that may be accessed by the endpoint 22, and establishes at least a subset of the virtual talk groups that may be presented to the endpoint 22 if it does not have sufficient resources. The subset of virtual talk groups may be established by presenting options that may be selected to either increase the resources or reduce the demand. The virtual talk groups may be selected in accordance with the selections Modifications, additions, or omissions may be made to communication system 10 without departing from the scope of the invention. The components of communication system 10 may be integrated or separated according to particular needs. Moreover, the operations of system 10 may be performed by more, fewer, or other modules. Additionally, operations of system 10 may be performed using any suitable logic.

Figure 2:
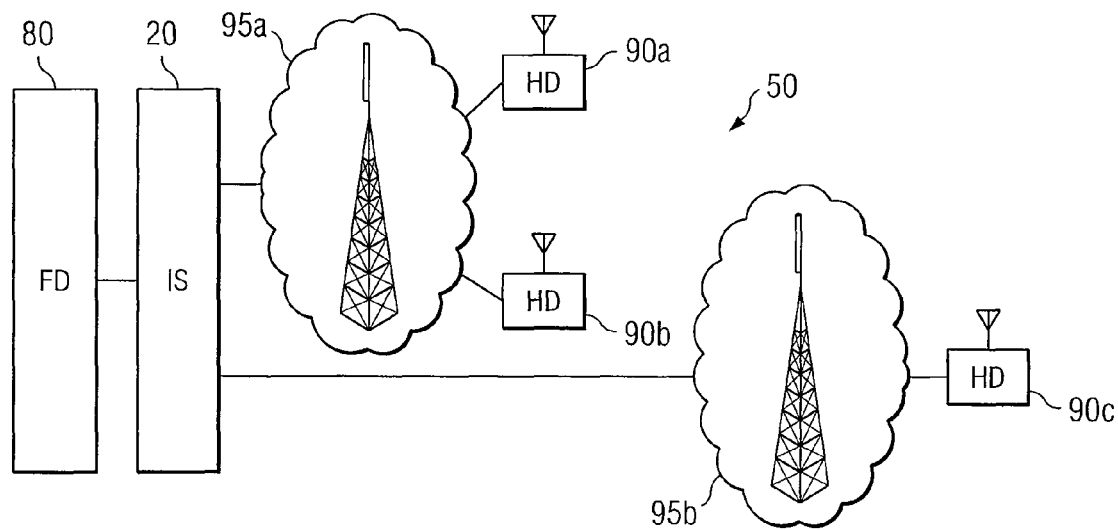
FIG. 2 illustrates a system for providing a push-to-talk communication session, in accordance with a particular embodiment.

FIG. 2 illustrates a communication system 50 for providing a push-to-talk communication session, in accordance with a particular embodiment. Communication system 50 includes a full duplex endpoint 80, one or more half-duplex endpoints 90a-c, one or more communication networks 95a-b, and an IS 20 coupled as shown.

Communication networks 95 allow for communication among endpoints 90, and may comprise, for example, land mobile radio networks of different public or private groups. Endpoints 80 and 90, however, may communicate with IS 20 through any of a variety of communication networks. In some cases, communications between endpoints 80 and 90 may not travel through IS 20, but may travel through gateways and other network components controlled by IS 20.

IS 20 may be substantially similar to the IS generally described with reference to FIG. 1. IS 20 may facilitate interoperable communication among endpoints 80 and 90, and is described in more detail with reference to FIG. 3. Endpoints 80 and 90 may be substantially similar to endpoints generally described with reference to FIG. 1. An example endpoint is described in more detail with reference to FIG. 4.

Endpoint 80 represents any suitable full duplex endpoint capable of communicating in a full duplex manner. A full duplex endpoint may receive and transmit communications at the same time using, for example, separate communication channels for incoming and outgoing communications. A channel may refer to a unidirectional or bidirectional path for transmitting and/or receiving electrical or electromagnetic signals. For example, a channel may comprise a conventional radio physical radio frequency (RF) channel. Example full duplex endpoints include a PSTN phone and a cellular phone. The communication may comprise any suitable media modality, for example, voice, data, text, video, IM, other media modality, or any suitable combination of the preceding.

Endpoints 90 represent any suitable half-duplex endpoint capable of communicating in a half-duplex manner. A half-duplex endpoint may only either transmit or receive communications at one time, as one communication channel is used for incoming and outgoing communications. An example half-duplex endpoint comprises a push-to-talk endpoint such as a push-to-talk land mobile radio. To communicate over the channel, a user may select a push-to-talk button by, for example, pushing the button. To end communication over the channel, the user may deselect the push-to-talk button by, for example, releasing the button.

According to one embodiment of operation, full duplex endpoint 80 calls into IS 20 in order to participate in a virtual talk group, which may include other full duplex endpoint 80 and half-duplex endpoints 90. IS 20 facilitates communication among the endpoints 80 and 90. For example, a multipoint conference system of IS 20 may bridge together transmissions from an endpoint 80 or 90 for communication to the other endpoints 80 or 90.

An endpoint 80 or 90 may "control the floor" in order to become an active endpoint and have its communications transmitted to and received by other endpoints 80 or 90. Otherwise, communication from endpoint 80 may not reach a half-duplex endpoint 90 that is currently sending a communication, and vice versa.

IS 20 may provide floor control through a mute function. An endpoint 80 or 90 that has floor control is allowed to communicate, and the other endpoints 80 or 90 are muted. As an example, when the endpoint 80 or 90 has floor control, communications from the endpoint 80 or 90 are transmitted to the other endpoints 80 or 90, which are muted. IS 20 prevents the other endpoints 80 or 90 from gaining floor control when the endpoint 80 or 90 has floor control. When the endpoint 80 or 90 does not have floor control, another endpoint 80 or 90 may gain floor control to send communications.

According to one embodiment, IS 20 may facilitate communication among endpoints of various networks through virtual talk groups. A talk group may comprise a defined set of users (for example, radio users) who share a common functional responsibility and typically coordinate actions amongst themselves without radio interface with other talk groups. For example, a municipality's police department network may include various talk groups of different users.

A virtual talk group may allow member endpoints of a talk group to interoperably communicate over a virtual channel. A virtual channel may comprise a virtual channel address through which member endpoints may access the virtual talk group and/or through which communications from member endpoints are bridged. As an example, a virtual channel address may comprise an IP address. A virtual talk group may have a virtual talk group identifier that uniquely identifies the virtual talk group.

A virtual talk group may have any suitable communications means. As a first example, endpoints of a virtual talk group may use a multicast address for access. As a second example, a virtual talk group may comprise multiple talk groups, such as multiple radio sources from different frequencies with mixed communications. As a third example, a virtual talk group may comprise a unicast group or a combination unicast and multicast group.

Virtual talk groups may be created using any suitable user/endpoint groups or channels based on location, organizational requirements, event requirements, or any other suitable characteristic. An example virtual talk group may comprise channels or other multicast paths used by endpoints of a police department's radio network, a fire department's radio network, a corporation's security radio network, and IP-enabled endpoints such as IP phones, IP-enabled PDAs, or PCs.

A virtual talk group may be associated with one or more features. A feature may refer to a particular capability of the virtual talk group. Example features include, for example, recording information, playing information, other capability, or any combination of the preceding. Information may include, for example, audio, data, text, video, IM, other media, or any suitable combination of the preceding, about a communication or a scene associated with an endpoint 80 or 90. The information may be presented in any of a variety of encoding formats, which may utilize different resources from the endpoint in order to receive information from and/or send information to other endpoints.

According to the embodiment, communication system 50 may manage the capabilities of endpoints 90 by determining whether an endpoint 90 has sufficient resources to participate in virtual talk groups that may be accessed by the endpoint 90, and establishes at least a subset of the virtual talk groups that may be presented to the endpoint 90 if it does not have sufficient resources. The subset of virtual talk groups may be established by presenting options that may be selected to either increase the resources or reduce the demand. The virtual talk groups may be selected in accordance with the selections.

Modifications, additions, or omissions may be made to system 50 without departing from the scope of the invention. The components of system 50 may be integrated or separated according to particular needs. Moreover, the operations of system 50 may be performed by more, fewer, or other modules. Additionally, operations of system 50 may be performed using any suitable logic.

Figure 3:
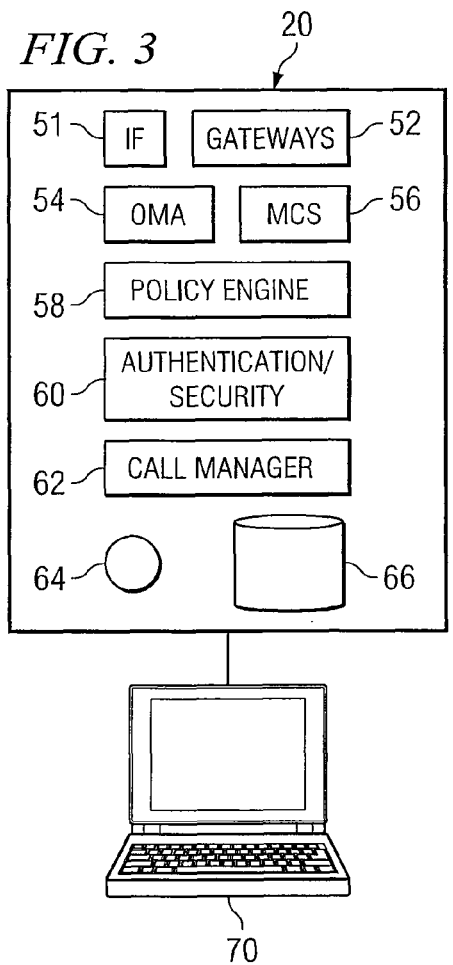
FIG. 3 illustrates an example interoperability system that may be used with the system of FIG. 2, in accordance with a particular embodiment.

FIG. 3 illustrates an IS 20, in accordance with a particular embodiment. IS 20 may be substantially similar to the IS of FIG. 1 or of FIG. 2. IS 20 may be used by any suitable person, such as a dispatcher, an administrator, or a first responder mobile user.

A control endpoint may refer to an endpoint utilized to access, configure, and control the functionality of IS 20. In one embodiment, a PC endpoint 70 may be used to access, configure, and control IS 20. PC endpoint 70 may run a client application for such access, configuration, and control. The client application may enable a user of endpoint 70 to receive and monitor communications from endpoints and virtual talk groups. Other suitable control endpoints, such as an IP phone, a PDA, or a mobile device, may be utilized to access, configure, and control IS 20.

In the illustrated embodiment, IS 20 includes an interface (I/F) 51, gateways 52, an operations management application (OMA) 54, a multipoint conference system (MCS) 56, a policy engine 58, an authentication and security system 60, a call manager 62, a processor 64, and a memory module 66.

Interface 51 facilitates the communication of information between IS 20 and other network components. For example, interface 51 may receive communications from endpoints. The communication may take place over IP networks, which may reduce the need for dedicated wiring between the endpoints and IS 20.

Gateways 52 may represent one or more gateways that provide network interoperability. Example gateways 52 include LMR gateways, PSTN gateways, or application gateways. Gateways 52 may provide mappings between IP services and interoperable networks, such as an LMR network. In some cases, gateways 52 may not be located within IS 20, but may be distributed throughout a communication system for enabling communications among communication networks.

Operations management application (OMA) 54 includes functionality for configuration, management, and control of IS 20. OMA 54 may provide conference and collaboration management. OMA 54 may simultaneously monitor and provide communication ability for any number of channels to allow a user to simultaneously communicate with and control multiple virtual talk groups. OMA 54 may also authenticate a user and obtain user configuration information.

OMA 54 may be accessed by a user via a control endpoint, for example, PC endpoint 70 or a mobile endpoint. OMA 54 may allow a control endpoint to configure, manage, and simultaneously participate in one or more virtual talk groups and ad hoc conferences. In particular embodiments, OMA 54 may be accessed through a web interface functioning, for example, as a soft phone for a radio.

Multipoint conference system (MCS) 56 provides collaboration and conference services for multiple endpoints of one or more networks. For example, different types of endpoints of different networks may be bridged together through MCS 56 to provide virtual talk group communications. MCS 56 may include any suitable number or type of conference bridges, ports, digital signal processors, or other components to facilitate communications.

Policy engine 58 includes policies, such as predetermined and ad hoc policies, specifying actions to take in response to events in order to provide dynamic incident management. In one embodiment, policy engine 58 may receive input from detectors such as alarms and sensors. Policy engine 58 may then set up communication interoperability and one-way information collaboration, and may trigger additional actions such as pager, e-mail, or other notifications, dial-outs, data recording, or information escalation.

Authentication and security system 60 manages access, configuration, and control privileges for users of IS 20 and endpoints 22. Different users may have different privileges. Some users may have only transmit or listen privileges with respect to one or more particular talk groups, while other users may have the ability to communicate with all talk groups or to setup and configure talk groups. User privileges may dynamically change in response to the occurrence of particular events.

Call manager 62 maintains information regarding users, such as the users of IP networks for which interoperable communications are provided by IS 20. The information may include a name or other identifier and contact information such as phone numbers and email addresses.

Processor 64 may comprise a processor operable to provide IS 20 functionality, either alone or in conjunction with other IS components such as OMA 54. Such functionality may include providing features discussed herein. Other features may include: providing location information of endpoints; enabling an endpoint to listen to and/or participate in communications involving endpoints of a particular geographic area; presenting communication of endpoints of scene-related virtual talk groups; and controlling gateways and other network components to facilitate interoperable communications among endpoints.

Memory module 66 may comprise memory operable to store any suitable information utilized by IS 20. In particular embodiments, information may include information for user management, virtual talk group management, resource pool management, privileges, backup configuration, and/or timestamp and activity tracking.

IS 20 may be used to facilitate creation of a virtual talk group. An operator of IS 20 may configure a virtual talk group using any suitable interface. For example, an interface may allow an operator to configure a virtual talk group by dragging and dropping graphical elements representing channels and IP endpoints into an area representing the virtual talk group. An operator may configure group details such as name, description, participants, multicast IP addresses, codec, and latch options through, for example, OMA 54.

IS 20 may be used to facilitate communication among endpoints of a virtual talk group. MCS 56 may provide conferencing functionality for the endpoints. In particular embodiments, multiple talk groups may be patched together on a dynamic basis. In some cases, a virtual talk group may not necessarily include communications through IS 20, but may instead include member endpoints whose communications are mapped to IP addresses at gateways controlled by IS 20.

Modifications, additions, or omissions may be made to IS 20 without departing from the scope of the invention. For example, IS 20 may also include any number of switches, routers, firewalls, mobile access routers, access points, wireless bridges, or other components. The components of system IS 20 may be integrated or separated according to particular needs. Moreover, the operations of system IS 20 may be performed by more, fewer, or other modules. Additionally, operations of IS 20 may be performed using any suitable logic.

Figure 4:
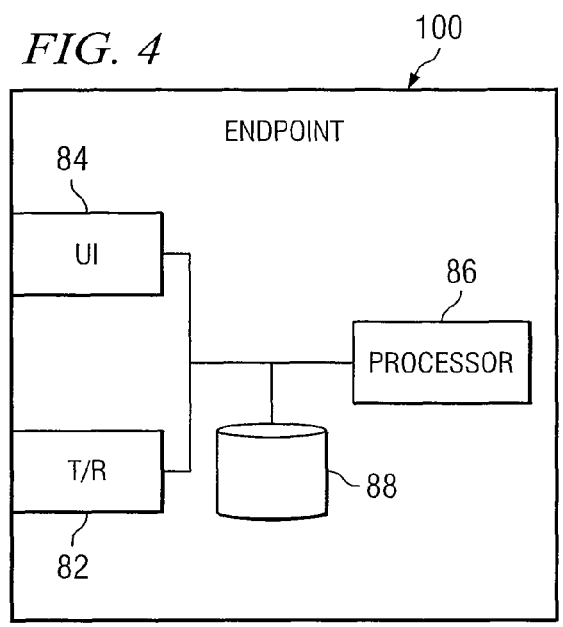
FIG. 4 illustrates an example endpoint that may be used with the system of FIG. 2, in accordance with a particular embodiment.

FIG. 4 illustrates an endpoint 100, in accordance with a particular embodiment. Endpoint 100 may represent any suitable device or system of devices operable to provide communication services to a user, and may be substantially similar to endpoints 22 of FIG. 1 or endpoints 80 and 90 of FIG. 2.

Endpoint 100 includes a transmitter/receiver 82, a user interface 84, a processor 86, and a memory module 88. Transmitter/receiver 82 transmits and receives streams that communicate information to and from other network components.

User interface 84 provides a mechanism through which a user of endpoint 100 may operate endpoint 100 and communicate with other network devices. User interface 84 may comprise, for example, a microphone, a speaker, a keypad, a display, or any other suitable interface. Instructions may be submitted through speech, keystrokes, soft keystrokes, or other mechanism. According to one embodiment, user interface 84 includes a microphone operable to record an announcement for a user, and a speaker operable to play an announcement for a user. An example user interface 84 is described with reference to FIG. 5.

Processor 86 may comprise a processor operable to facilitate operation of endpoint 100. Memory module 88 may comprise memory operable to store information for endpoint 80.

Modifications, additions, or omissions may be made to endpoint 100 without departing from the scope of the invention. The components of endpoint 100 may be integrated or separated according to particular needs. Moreover, the operations of endpoint 100 may be performed by more, fewer, or other modules. Additionally, operations of endpoint 100 may be performed using any suitable logic.

Figure 5:
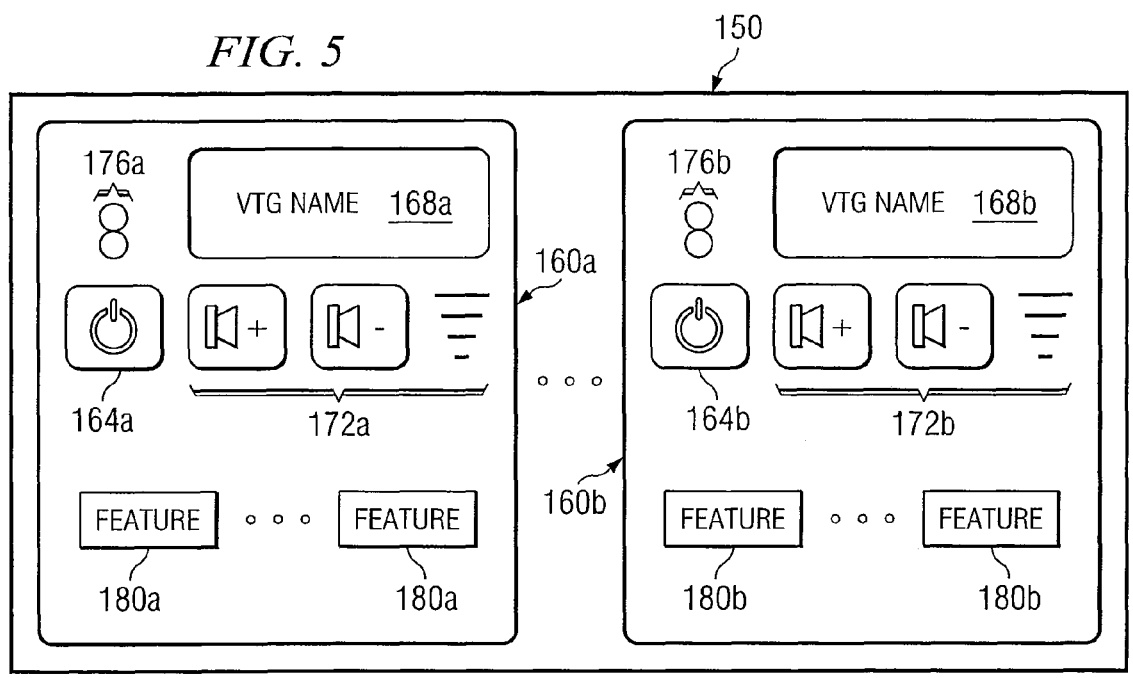
FIG. 5 illustrates an example endpoint user interface that may be used with the endpoint of FIG. 4, in accordance with a particular embodiment.

FIG. 5 illustrates an example endpoint user interface 150, in accordance with a particular embodiment. User interface 150 may be used with endpoint 100 of FIG. 4 to select and manage participation in virtual talk groups.

User interface 150 includes one or more group sections 160. A group section 160 may correspond to a virtual talk group, and may be used to manage participation in the virtual talk group. A group section 160 for a virtual talk group includes an activation/deactivation selector 164, a push-to-talk button 168, volume controls 172, transmit and receive indicators 176, and feature controls 180.

Activation/deactivation selector 168 may be used to activate or deactivate a channel to, for example, join or leave the virtual talk group. Push-to-talk button 168 may be used to request floor control from IS 20 in order to be able to send streams to other members of the virtual talk group. Push-to-talk button 168 may be selected to request floor control by, for example, pushing the button, and may be deselected to relinquish floor control by, for example, releasing the button.

According to the illustrated embodiment, push-to-talk button 168 displays the name of the virtual talk group.

Volume controls 172 may be used to increase or decrease the volume from the virtual talk group. A volume control 172 may include an indicator that indicates the volume level of the channel. Transmit and receive indicators 176 may indicate whether traffic is being transmitted and/or received. Feature controls 180 may be used to activate or deactivate features of a virtual talk group. For example, a feature button may add video communication among members of a virtual talk group, while another feature button may invoke recording of audio communication among the members of the virtual talk group.

Modifications, additions, or omissions may be made to user interface 150 without departing from the scope of the invention. User interface 150 may include more, fewer, or other graphical elements. Additionally, graphical elements may be configured in any suitable arrangement without departing from the scope of the invention.

Figure 6:
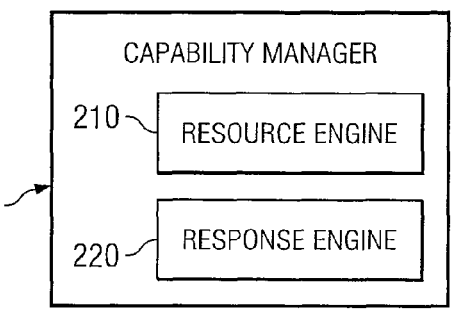
FIG. 6 illustrates an example endpoint capability manager that may be used with the system of FIG. 2, in accordance with a particular embodiment.

FIG. 6 illustrates an example capability manager 200, in accordance with a particular embodiment. According to the embodiment, capability manager 200 determines whether an endpoint has sufficient resources to participate in virtual talk groups that may be accessed by the endpoint, and establishes at least a subset of the virtual talk groups that may be presented to the endpoint if it does not have sufficient resources. Capability manager 200 may be used with any suitable endpoint device, for example, endpoint 22, 80, 90, or 100. In one example, capability manager 200 is used with user endpoint 90 and dispatcher endpoint 80.

According to the illustrated embodiment, capability manager 200 includes a resource engine 210 and a response engine 220. Capability manager may be embedded within IS 20 or run on a separate server coupled to IS 20. Resource engine 210 determines whether user endpoint 90 has sufficient resources to participate in virtual talk groups that may be accessed by user endpoint 90. Resource engine 210 may determine whether user endpoint 90 has sufficient resources by establishing the resources of user endpoint 90, estimating the demands of participating in the virtual talk groups, and determining whether user endpoint 90 has sufficient resources to meet the demands.

A resource of user endpoint 90 may refer to a resource of an endpoint that may be used to participate in a virtual talk group. Example resources include the speed of the central processing unit, the size of the memory, the input/output bandwidth, the speed of the input/output bus, other resource that may be used to participate in a virtual talk group, or any suitable combination of the preceding. A demand of participating in a virtual talk group may refer to the amount and type of resource that an endpoint expends to participate in the virtual talk group.

One or more suitable devices may determine whether user endpoint 90 has sufficient resources. According to one embodiment, user endpoint 90 sends information describing its resources to IS 20, which estimates the demands of participating in the virtual talk groups and determines whether user endpoint 90 has sufficient resources to join another virtual talk group or to invoke another feature of the virtual talk groups of which the user is a member. User endpoint 90 may send the information to IS 20 in any suitable manner. For example, user endpoint 90 may send the information via a keep-alive exchange. According to another embodiment, user endpoint 90 establishes its resources, estimates the demand of participating in the virtual talk group, and determines whether it has sufficient resources.

Response engine 220 determines the response to establishing whether user endpoint 90 has sufficient resources. If user endpoint 90 has sufficient resources, response engine 220 presents to user endpoint 90 the virtual talk groups to which it has access or allows the user to invoke features and services associated with any given channel. A user of endpoint 90 may use endpoint 90 to activate channels to participate in the virtual talk groups or to invoke features and services associated with any given channel.

If endpoint 90 does not have sufficient resources, response engine 220 may establish at least a subset the virtual talk groups that may be presented to the user endpoint 90. The subset may be established in any suitable manner. According to one embodiment, response engine 220 may present options that may be selected by any suitable user, such as user of user endpoint or a dispatcher of a dispatcher endpoint, to allow user endpoint 90 to have sufficient resources.

The options may be presented to an endpoint of the selecting user in any suitable manner. In one case, the options may be presented to an endpoint by causing the endpoint to present elements, such as graphical elements, where each element represents an option. An element may be used to select or deselect the corresponding option. For example, an element representing an object may be embodied as a soft key that can be used to select or deselect the object. An element may indicate whether an option is selectable or not selectable. For example, a soft key may be one color when it is selectable and may be grayed out when it is not selectable.

In another case, the options may be presented to an endpoint by causing the endpoint to provide a message telling the selecting user to perform an action to select or deselect an option. For example, a message may tell the selecting user to switch to another endpoint.

In another case, the options may be presented to an endpoint by presenting a recommendation to the endpoint. A recommendation may suggest that the user switch off a feature in order to release resources. For example, the recommendation may suggest that the user switch off a video feature on an existing channel in order to enable the user to participate in another virtual talk group. In addition, a recommendation may suggest that the user switch to an operation that places less demand on resources. For example, the recommendation may suggest that the user switch audio processing from a more computationally demanding codec, for example, a G.723 codec, to a less computationally demanding codec, for example, a G.711 codec.

The options may be presented to any suitable endpoint to receive a selection from any suitable selecting user. As an example, the options may be presented to user endpoint 90 to allow the user to select the options. As another example, the options may be presented to dispatcher endpoint 80 to allow the dispatcher to select the options. As another example, the options may be presented to a first endpoint, and then to a second endpoint if the first endpoint fails to respond after a predetermined period of time.

Options of one or more different types may be presented. In a first embodiment, options for virtual talk groups may be presented. For example, options for all of the virtual talk groups that user endpoint 90 may access may be presented. In a second embodiment, an option for selecting a different user endpoint may be presented. For example, a message may tell a user to switch to a more powerful user endpoint, such as from a laptop to a desktop personal computer, to provide more resources to meet the demand. In a third embodiment, options for selecting features of virtual talk groups may be presented. For example, options for recording and for playing information may be presented.

According to one embodiment, an endpoint may be presented with one or more different types of options. For example, user endpoint 90 may be presented with virtual talk group options, endpoint options, feature options, or any suitable combination of the preceding. According to another embodiment, a first endpoint may be presented with a first type of option, and a second endpoint may be presented with a second type of option. For example, user endpoint 90 may be presented with endpoint options, and dispatcher endpoint 80 may be presented with virtual talk group options.

The selecting user may be guided to select options that allow for sufficient resources. In a first embodiment, the selecting user may correlate the selections of the users and instruct the users accordingly. For example, if members of the virtual talk group introduce video streaming, the system may encourage other members to take advantage of the new available information and tell them how to obtain the additional resources. For example, when a user places a mouse over a video feature button of a police virtual talk group, the system may instruct the user to deactivate the other three channels to which he is listening in order to enable the video streaming.

In a second embodiment, the selecting user may be provided with the number of options that may be selected from the total number of options. For example, a selecting user may be instructed to select three out of five virtual talk groups.

In a third embodiment, as the selecting user selects certain options, other options may become non-selectable because of the additional resources needed by the selected options. Similarly, as the user deselects certain options, other options may become selectable because of the additional resources released by the deselected options. For example, when a user selects a virtual talk group, a feature of another virtual talk group becomes non-selectable. In a fourth embodiment, the selecting user may be provided with a message indicating the selection or deselection of an option will require or release certain resources.

According to one embodiment, response engine 220 may automatically select options according to one or more predefined rules. According to a first example rule, a predetermined number of options are selected. For example, the first three virtual talk groups are selected. According to a second example rule, the options may be selected according to a priority. For example, virtual talk groups are selected according to a priority assigned by the dispatcher.

Response engine 220 may perform other suitable responses. As an example, response engine 220 may send a notification to user endpoint 90, dispatcher endpoint 80, other endpoint 100, or any combination of the preceding, of whether user endpoint 90 has or does not have sufficient resources.

Modifications, additions, or omissions may be made to capability manager 200 without departing from the scope of the invention. The components of capability manager 200 may be integrated or separated according to particular needs. Moreover, the operations of capability manager 200 may be performed by more, fewer, or other modules. Additionally, operations of capability manager 200 may be performed using any suitable logic.

Figure 7:
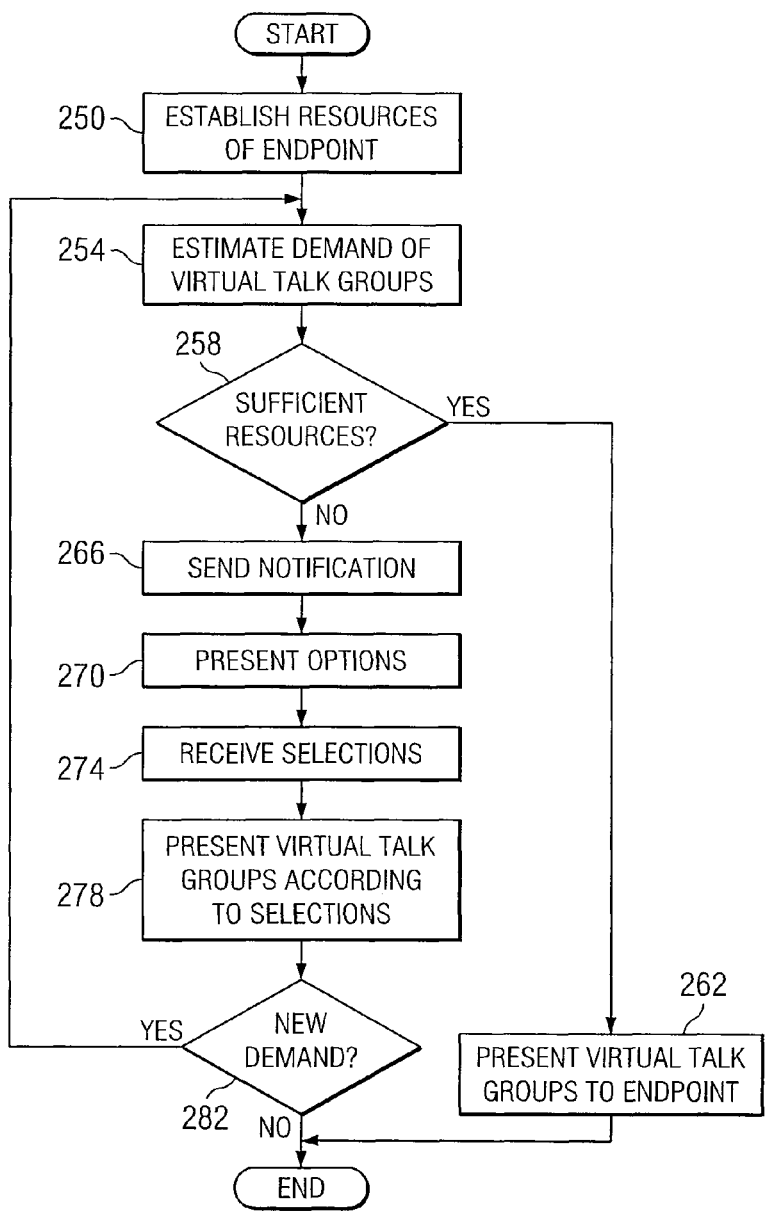
FIG. 7 illustrates a method for providing a push-to-talk communication session that may be used with the system of FIG. 2, in accordance with a particular embodiment.

FIG. 7 illustrates a method for providing a push-to-talk service, in accordance with a particular embodiment. The push-to-talk service may be provided in part by IS 20 for a push-to-talk endpoint 22 communicating with one or more virtual talk groups in one or more communication sessions.

The method begins at step 250, where the resources of user endpoint 90 are established. The resources may be established by user endpoint 90 or by IS 20. The demand of the virtual talk groups to which user endpoint 90 has access is estimated at step 254. The demand of a virtual talk group may take into account the features provided along with the virtual talk groups. There may be sufficient resources at step 258. The resources may be regarded as sufficient if the resources can meet the demand without degrading quality beyond a predetermined point.

If resources are sufficient, the method proceeds to step 262, where the virtual talk groups are presented to user endpoint 90. A user may select to participate in the presented virtual talk groups. After presenting the virtual talk groups, the method terminates.

If resources are not sufficient at step 258, the method proceeds to 266. A notification that the resources are not sufficient is sent at step 266. The notification may be sent to user endpoint 90, dispatcher endpoint 80, other endpoint, or any combination of the preceding.

Options are presented at step 270. Options may include the options to select virtual talk groups, endpoints, features, or any suitable combination of the preceding. The options may be presented to any suitable endpoint to allow for selection by any suitable selector, for example, the user or the dispatcher. According to one embodiment, the system itself may make a selection according to predetermined rules. The selections are received at step 274. The virtual talk groups are presented according to the selections at step 278.

There may be a new demand at step 282. As an example, the user of user endpoint 90 may select a new feature or a new talk group. If there is a new demand, the method returns to step 254, where the new demand is estimated. If there is no new demand at step 278, the method terminates.

Modifications, additions, or omissions may be made to the method without departing from the scope of the invention. The method may include more, fewer, or other steps. Additionally, steps may be performed in any suitable order without departing from the scope of the invention.

Technical advantages of particular embodiments include managing the capabilities of an endpoint by determining whether an endpoint has sufficient resources to participate in virtual talk groups that may be accessed by the endpoint, and establishing at least a subset of the virtual talk groups that may be presented to the endpoint if it does not have sufficient resources.

In addition, in particular embodiments, the subset of virtual talk groups may be established by presenting options that may be selected to either increase the resources or reduce the demand. The virtual talk groups may be selected in accordance with the selections.

While various implementations and features are discussed with respect to multiple embodiments, it should be understood that such implementations and features may be combined in various embodiments. For example, features and functionality discussed with respect to a particular figure may be used in connection with features and functionality discussed with respect to another figure according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged, or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations, and modifications may be ascertained by those skilled in the art. The present invention encompasses all such changes, substitutions, variations, alterations, and modifications as falling within the spirit and scope of the appended claims.

What is claimed is:

1. A method for providing one or more virtual talk groups to an endpoint, comprising:
   establishing, by a processor, one or more resources belonging to a user endpoint used by a user;
   estimating, by the processor, a demand that a plurality of virtual talk groups places on the endpoint, the demand indicating an amount of the one or more resources that the endpoint expends to participate in the plurality of virtual talk groups;
   determining, by the processor, whether the one or more resources are capable of satisfying the demand;
   establishing, by the processor, at least a subset of the virtual talk groups to present to the user endpoint if the one or more resources are not capable of satisfying the demand by presenting a recommendation to the user endpoint to reduce the demand and selecting the subset of the virtual talk groups according to a response from the user endpoint; and
   providing at least the subset of the virtual talk groups to the user endpoint to allow the user to select a virtual talk group.

2. The method of claim 1, wherein establishing at least the subset of the virtual talk groups further comprises:
   presenting the virtual talk groups for selection; and
   receiving a selection of at least the subset of the virtual talk groups.

3. The method of claim 1, wherein:
   establishing at least the subset of the virtual talk groups further comprises:
      presenting one or more features of the virtual talk groups for selection; and
      receiving a selection of at least a subset of the one or more features; and
   providing at least the subset of the virtual talk groups to the user endpoint further comprises:
      providing at least the subset of the virtual talk groups with at least the subset of the one or more features.

4. The method of claim 1, wherein establishing at least the subset of the virtual talk groups further comprises:
   sending a message requesting selection of a next user endpoint; and
   establishing that the next user endpoint has been selected.

5. The method of claim 1, wherein establishing at least the subset of the virtual talk groups further comprises:
   presenting one or more options to the user endpoint for selection, selection of an option of the one or more options operable to reduce the demand or increase the one or more resources.

6. The method of claim 1, wherein establishing at least the subset of the virtual talk groups further comprises:
   presenting one or more options to a dispatcher endpoint for selection, selection of an option of the one or more options operable to reduce the demand or increase the one or more resources.

7. The method of claim 1, wherein establishing at least the subset of the virtual talk groups further comprises:
   establishing at least the subset of the virtual talk groups according to one or more predetermined rules.

8. The method of claim 1, wherein establishing at least the subset of the virtual talk groups further comprises:
   presenting one or more options for selection, the one or more options comprising selecting or deselecting at least one of the following:
   a video option;
   a recording option; and
   a media processing codec option.

9. The method of claim 1, wherein establishing at least the subset of the virtual talk groups further comprises:
   detecting an option considered by the user endpoint; and
   presenting a recommendation of one or more options for selection, selection of the one or more options operable to increase the one or more resources to allow for the considered option.

10. A system for providing one or more virtual talk groups to an endpoint, comprising:
    an interface operable to communicate with a user endpoint; and
    a processor coupled to the interface and operable to:
       establish one or more resources belonging to the user endpoint used by a user;
       estimate demand that virtual talk groups places on the endpoint, the demand indicating an amount of the one or more resources that the endpoint expends to participate in the plurality of virtual talk groups;
       determine whether the one or more resources are capable of satisfying the demand;
       establish at least a subset of the virtual talk groups to present to the user endpoint if the one or more resources are not capable of satisfying the demand by presenting a recommendation to the user endpoint to reduce the demand and selecting the subset of the virtual talk groups according to a response from the user endpoint; and
       provide at least the subset of the virtual talk groups to the user endpoint to allow the user to select a virtual talk group.

11. The system of claim 10, the processor further operable to establish at least the subset of the virtual talk groups by:
    presenting the virtual talk groups for selection; and
    receiving a selection of at least the subset of the virtual talk groups.

12. The system of claim 10, the processor further operable to:
    establish at least the subset of the virtual talk groups by:
       presenting one or more features of the virtual talk groups for selection; and
       receiving a selection of at least a subset of the one or more features; and
    provide at least the subset of the virtual talk groups to the user endpoint by:
       providing at least the subset of the virtual talk groups with at least the subset of the one or more features.

13. The system of claim 10, the processor further operable to establish at least the subset of the virtual talk groups by:
    sending a message requesting selection of a next user endpoint; and
    establishing that the next user endpoint has been selected.

14. The system of claim 10, the processor further operable to establish at least the subset of the virtual talk groups by:
    presenting one or more options to the user endpoint for selection, selection of an option of the one or more options operable to reduce the demand or increase the one or more resources.

15. The system of claim 10, the processor further operable to establish at least the subset of the virtual talk groups by:

presenting one or more options to a dispatcher endpoint for selection, selection of an option of the one or more options operable to reduce the demand or increase the one or more resources.

16. The system of claim 10, the processor further operable to establish at least the subset of the virtual talk groups by:
establishing at least the subset of the virtual talk groups according to one or more predetermined rules.

17. The system of claim 10, the processor further operable to establish at least the subset of the virtual talk groups by:
presenting one or more options for selection, the one or more options comprising selecting or deselecting at least one of the following:
a video option;
a recording option; and
a media processing codec option.

18. The system of claim 10, the processor further operable to establish at least the subset of the virtual talk groups by:
detecting an option considered by the user endpoint; and
presenting a recommendation of one or more options for selection, selection of the one or more options operable to increase the one or more resources to allow for the considered option.

19. A system for providing one or more virtual talk groups to an endpoint, the system comprising one or more devices operable to:
establish one or more resources of a user endpoint used by a user, the one or more resources comprising a bandwidth of the endpoint;
estimate demand of virtual talk groups, the demand placed on the one or more resources;
determine whether the one or more resources are capable of satisfying the demand;
establish at least a subset of the virtual talk groups that may be presented to the user endpoint if the one or more resources are not capable of satisfying the demand by presenting a recommendation to the user endpoint to reduce the demand and selecting the subset of the virtual talk groups according to a response from the user endpoint; and
provide at least the subset of the virtual talk groups to the user endpoint to allow the user to select a virtual talk group.

20. The system of claim 19, the one or more devices further operable to establish at least the subset of the virtual talk groups by:
presenting the virtual talk groups for selection; and
receiving a selection of at least the subset of the virtual talk groups.

21. The system of claim 19, the one or more devices further operable to:
establish at least the subset of the virtual talk groups by:
presenting one or more features of the virtual talk groups for selection; and
receiving a selection of at least a subset of the one or more features; and
provide at least the subset of the virtual talk groups to the user endpoint by:
providing at least the subset of the virtual talk groups with at least the subset of the one or more features.

22. The system of claim 19, the one or more devices further operable to establish at least the subset of the virtual talk groups by:
sending a message requesting selection of a next user endpoint; and
establishing that the next user endpoint has been selected.

23. The system of claim 19, the one or more devices further operable to establish at least the subset of the virtual talk groups by:
presenting one or more options to the user endpoint for selection, selection of an option of the one or more options operable to reduce the demand or increase the one or more resources.

24. The system of claim 19, the one or more devices further operable to establish at least the subset of the virtual talk groups by:
presenting one or more options to a dispatcher endpoint for selection, selection of an option of the one or more options operable to reduce the demand or increase the one or more resources.

25. The system of claim 19, the one or more devices further operable to establish at least the subset of the virtual talk groups by:
establishing at least the subset of the virtual talk groups according to one or more predetermined rules.

26. The system of claim 19, the one or more devices further operable to establish at least the subset of the virtual talk groups by:
presenting one or more options for selection, the one or more options comprising selecting or deselecting at least one of the following:
a video option;
a recording option; and
a media processing codec option.

27. The system of claim 19, the one or more devices further operable to establish at least the subset of the virtual talk groups by:
detecting an option considered by the user endpoint; and
presenting a recommendation of one or more options for selection, selection of the one or more options operable to increase the one or more resources to allow for the considered option.

28. A system for providing one or more virtual talk groups to an endpoint, comprising:
means for establishing one or more resources of a user endpoint used by a user, the one or more resources comprising a bandwidth of the endpoint;
means for estimating demand of virtual talk groups, the demand placed on the one or more resources;
means for determining whether the one or more resources are capable of satisfying the demand;
means for establishing at least a subset of the virtual talk groups that may be presented to the user endpoint if the one or more resources are not capable of satisfying the demand by presenting a recommendation to the user endpoint to reduce the demand and selecting the subset of the virtual talk groups according to a response from the user endpoint; and
means for providing at least the subset of the virtual talk groups to the user endpoint to allow the user to select a virtual talk group.

29. A method for providing one or more virtual talk groups to an endpoint, comprising:
establishing one or more resources of a user endpoint used by a user, the one or more resources comprising a bandwidth of the endpoint;
estimating demand of virtual talk groups, the demand placed on the one or more resources;
determining whether the one or more resources are capable of satisfying the demand;
establishing at least a subset of the virtual talk groups that may be presented to the user endpoint if the one or more resources are not capable of satisfying the demand by presenting a recommendation to the user endpoint to reduce the demand and selecting the subset of the virtual talk groups according to a response from the user endpoint, establishing at least the subset of the virtual talk groups further comprising:
presenting the virtual talk groups for selection;
receiving a selection of at least the subset of the virtual talk groups;
presenting one or more features of the virtual talk groups for selection;
receiving a selection of at least a subset of the one or more features;
sending a message requesting selection of a next user endpoint;
establishing that the next user endpoint has been selected;
presenting one or more options to the user endpoint to allow the user to select a virtual talk group and to a dispatcher for selection, selection of an option of the one or more options operable to reduce the demand or increase the one or more resources, the one or more options comprising selecting or deselecting at least one of the following:
a video option;
a recording option; and
a media processing codec option;
detecting an option considered by the user endpoint; and
presenting a recommendation of one or more next options for selection, selection of the one or more next options operable to increase the one or more resources to allow for the considered option; and
establishing at least the subset of the virtual talk groups according to one or more predetermined rules; and
providing at least the subset of the virtual talk groups to the user endpoint, providing at least the subset of the virtual talk groups to the user endpoint further comprising:
providing at least the subset of the virtual talk groups with at least the subset of the one or more features.

* * * * *